United States Patent
Lee et al.

(10) Patent No.: US 9,625,946 B2
(45) Date of Patent: Apr. 18, 2017

(54) DISPLAY DEVICE

(71) Applicant: SAMSUNG DISPLAY CO., LTD., Yongin, Gyeonggi-do (KR)

(72) Inventors: Jung Hun Lee, Hwaseong-si (KR); Youn Joon Kim, Seoul (KR); Cheol Su Kim, Seoul (KR); Yoon Jee Shin, Ulsan (KR); Sang Jo Lee, Hwaseong-si (KR); Jang Doo Lee, Suwon-si (KR); Ju Suck Lee, Seoul (KR); Kyung Min Choi, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 137 days.

(21) Appl. No.: 14/560,007

(22) Filed: Dec. 4, 2014

(65) Prior Publication Data

US 2016/0034000 A1    Feb. 4, 2016

(30) Foreign Application Priority Data

Aug. 1, 2014  (KR) .................. 10-2014-0099108

(51) Int. Cl.
*G06F 1/16* (2006.01)
*B65H 75/36* (2006.01)
*H04M 1/02* (2006.01)

(52) U.S. Cl.
CPC ............ *G06F 1/1652* (2013.01); *B65H 75/36* (2013.01); *G06F 1/16* (2013.01); *H04M 1/0268* (2013.01)

(58) Field of Classification Search
CPC ......... G06F 1/16; G06F 1/1652; B65H 75/36; H04M 1/0268
See application file for complete search history.

(56) References Cited

U.S. PATENT DOCUMENTS

| | | | |
|---|---|---|---|
| 3,466,776 A | 9/1969 | Paige | |
| 4,540,223 A * | 9/1985 | Schmerda | H01R 35/025 439/15 |
| 4,646,453 A | 3/1987 | Reinhart | |
| 4,927,365 A * | 5/1990 | Schauer | B60R 16/027 439/15 |
| 5,818,165 A | 10/1998 | Malhi | |
| 6,055,753 A | 5/2000 | Sondericker, III | |
| 6,498,597 B1 | 12/2002 | Sawano | |
| 6,680,724 B2 | 1/2004 | Lichtfuss | |
| 6,771,237 B1 | 8/2004 | Kalt | |
| 7,463,238 B2 * | 12/2008 | Funkhouser | G06F 1/1601 345/107 |
| 7,636,085 B2 * | 12/2009 | Yang | H04M 1/0268 345/107 |
| 7,710,370 B2 | 5/2010 | Slikkerveer et al. | |

(Continued)

FOREIGN PATENT DOCUMENTS

DE    EP 2444350 A1 *  4/2012  ............. B66B 3/00
JP    2004-279867 A    10/2004
(Continued)

*Primary Examiner* — Nathan Milakovich
(74) *Attorney, Agent, or Firm* — Lee & Morse P.C.

(57) ABSTRACT

Provided is a display device, including a flexible display panel; and a first roller connected to the display panel and having an outer surface, the first roller winding the flexible display panel on the outer surface, the first roller winding both in a first rotating direction and in a second rotating direction opposite to the first direction.

19 Claims, 11 Drawing Sheets

(56) References Cited

U.S. PATENT DOCUMENTS

| | | |
|---|---|---|
| 7,830,333 B2 | 11/2010 | Aoki |
| 7,965,258 B2 | 6/2011 | Aoki |
| 8,001,711 B2 | 8/2011 | Lafarre et al. |
| 8,767,394 B1 | 7/2014 | Hamburgen et al. |
| 9,098,241 B1* | 8/2015 | Cho ................... H05K 1/028 |
| 2002/0070910 A1* | 6/2002 | Fujieda ............... G06F 1/1615 345/85 |
| 2003/0071800 A1* | 4/2003 | Vincent ................. G02F 1/15 345/204 |
| 2005/0040962 A1 | 2/2005 | Funkhouser et al. |
| 2005/0105748 A1 | 5/2005 | Bartell |
| 2006/0061555 A1 | 3/2006 | Mullen |
| 2006/0209218 A1 | 9/2006 | Lee et al. |
| 2006/0238494 A1 | 10/2006 | Narayanaswami et al. |
| 2008/0005941 A1 | 1/2008 | Primiano et al. |
| 2008/0086925 A1 | 4/2008 | Yang |
| 2008/0144265 A1 | 6/2008 | Aoki |
| 2008/0204367 A1 | 8/2008 | Lafarre et al. |
| 2009/0073084 A1 | 3/2009 | Mullen |
| 2009/0231307 A1* | 9/2009 | Lee ..................... G06F 1/1601 345/184 |
| 2010/0060548 A1 | 3/2010 | Choi et al. |
| 2010/0134873 A1* | 6/2010 | van Lieshout .... G02F 1/133305 359/296 |
| 2010/0194785 A1 | 8/2010 | Huitema et al. |
| 2010/0220060 A1 | 9/2010 | Kobayashi |
| 2011/0018820 A1 | 1/2011 | Huitema et al. |
| 2011/0043976 A1 | 2/2011 | Visser et al. |
| 2011/0148797 A1 | 6/2011 | Huitema et al. |
| 2011/0188189 A1 | 8/2011 | Park et al. |
| 2011/0193829 A1 | 8/2011 | Tsai et al. |
| 2011/0227822 A1 | 9/2011 | Shai |
| 2012/0019482 A1 | 1/2012 | Wang |
| 2012/0075782 A1 | 3/2012 | Wu et al. |
| 2012/0204453 A1 | 8/2012 | Jung |
| 2012/0268665 A1 | 10/2012 | Yetukuri et al. |
| 2012/0306910 A1 | 12/2012 | Kim et al. |
| 2013/0127799 A1* | 5/2013 | Lee ....................... G06F 1/1652 345/204 |
| 2013/0201208 A1 | 8/2013 | Cho et al. |
| 2013/0222416 A1 | 8/2013 | Kim et al. |
| 2013/0285922 A1 | 10/2013 | Alberth, Jr. et al. |
| 2013/0314387 A1 | 11/2013 | Kwack et al. |
| 2013/0314762 A1 | 11/2013 | Kwack et al. |
| 2013/0334981 A1 | 12/2013 | Kwack et al. |
| 2014/0002430 A1 | 1/2014 | Kwack et al. |
| 2015/0009636 A1* | 1/2015 | Jeong ................... B65H 18/10 361/749 |
| 2016/0100478 A1* | 4/2016 | Lee ......................... G06F 1/16 361/749 |
| 2016/0120023 A1* | 4/2016 | Choi ................... H05K 1/028 361/749 |
| 2016/0135284 A1* | 5/2016 | Choi ................... H05K 1/0393 361/749 |
| 2016/0139633 A1* | 5/2016 | Lee ..................... G06F 1/1652 345/33 |
| 2016/0163242 A1* | 6/2016 | Lee ......................... G09F 17/00 40/584 |
| 2016/0187929 A1* | 6/2016 | Kim ..................... G06F 1/1652 345/184 |
| 2016/0324021 A1* | 11/2016 | Takayanagi .......... H05K 5/0017 |

FOREIGN PATENT DOCUMENTS

| | | |
|---|---|---|
| KR | 10-2007-0120950 A | 12/2007 |
| KR | 10-2009-0069339 A | 6/2009 |
| KR | 10-2010-0016501 A | 2/2010 |
| KR | 10-2012-0093665 A | 8/2012 |

* cited by examiner

DISPLAY DEVICE

CROSS-REFERENCE TO RELATED APPLICATION

Korean Patent Application No. 10-2014-0099108, filed on Aug. 1, 2014 in the Korean Intellectual Property Office, and entitled: "Display Device," is incorporated by reference herein in its entirety.

BACKGROUND

1. Field

Provided is a display device, for example, a rollable display device.

2. Description of the Prior Art

Desirable characteristics of a flat panel display (FPD) may include, for example, a FPD that is thin, light-weight, and of large-size. Flat panel displays may include a liquid crystal display (LCD), a plasma display panel (PDP), and an organic light emitting display (OLED). Liquid crystal display, plasma display panel, and organic light emitting display may use glass substrates, their flexibility may become lowered, and their applications and uses may be limited.

SUMMARY

Embodiments may be realized by providing a display device, including a flexible display panel; and a first roller connected to the display panel and having an outer surface, the first roller winding the flexible display panel on the outer surface, the first roller winding both in a first rotating direction and in a second rotating direction opposite to the first direction.

A winding speed of the display panel in the first rotating direction may be different from a winding speed of the display panel in the second rotating direction.

A wound diameter of the display panel in the first rotating direction may be different from a wound diameter of the display panel in the second rotating direction.

The display device may further include a second roller connected to the display panel, facing the first roller, and having an outer surface, the second roller winding the flexible display panel on the outer surface of the second roller, the second roller winding in the first rotating direction or in the second rotating direction.

The display panel may be wound on the first roller and the second roller in a same rotating direction.

The display panel may be wound on the first roller and the second roller in different rotating directions.

The display device may further include a driving motor that rotates the first roller.

The display panel may include a display portion to display an image, a bonding portion at an edge of one side of the display portion connected to the first roller, and a driving integrated circuit chip on the bonding portion.

The first roller may include a recessed roller pad, and the bonding portion may be on the recessed roller pad.

The first roller may wind the display panel on the outer surface of the first roller alternately in the first and second directions in a periodic manner.

Winding the display panel on the outer surface of the first roller alternately in the first and second directions in a periodic manner may disperse stress that may be caused due to winding of the display panel in only one direction and may prevent changing of static characteristics of the display panel.

The display device may further include a housing accommodating the display panel and the first roller.

Embodiments may be realized by providing a display device, including a housing having an opening at one surface thereof; and a flexible display panel that winds both in a first rotating direction and in a second rotating direction opposite to the first direction, the flexible display panel accommodated in the housing, the flexible display panel winding in and out of the housing through the opening.

The display device may further include a first roller in the housing, the first roller connected having an outer surface, the first roller winding the flexible display panel on the outer surface, the first roller winding both in a first rotating direction and in a second rotating direction opposite to the first direction.

The first roller may wind the display panel on an outer surface of the first roller alternately in the first and second directions in a periodic manner.

Winding the display panel on the outer surface of the first roller alternately in the first and second directions in a periodic manner may disperse stress that may be caused due to winding of the display panel in only one direction and may prevent changing of static characteristics of the display panel.

The display device may further include a second roller connected to the display panel, facing the first roller, and having an outer surface, the second roller winding the flexible display panel on the outer surface of the second roller, the second roller winding in a same direction as a direction of the first roller or in a different direction from the direction of the first roller.

The display device may further include a driving motor that rotates the first roller.

A winding speed of the display panel in the first rotating direction may be different from a winding speed of the display panel in the second rotating direction; or a wound diameter of the display panel in the first rotating direction may be different from a wound diameter of the display panel in the second rotating direction.

The display device may further include at least one of a fixing member that may prevent the display panel from being overwound or a support member configured to support the display panel when the display panel is unwound.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
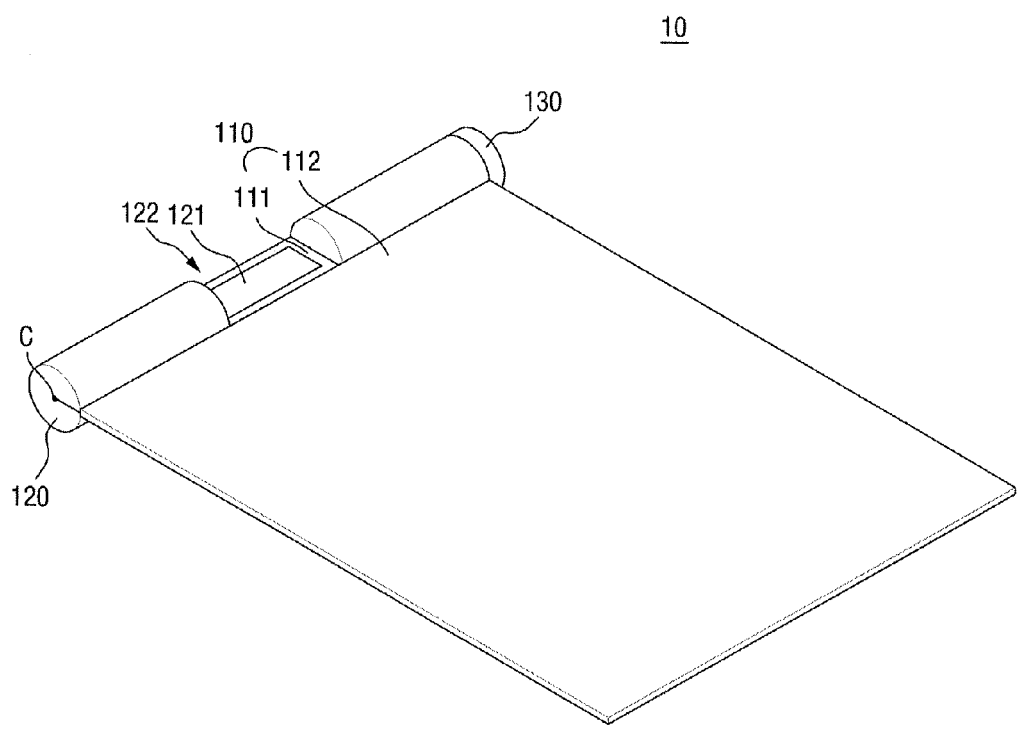
FIG. 1 illustrates a perspective view of a display device according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

The term "on" that is used to designate that an element is on another element or located on a different layer or a layer includes both a case where an element is located directly on another element or a layer and a case where an element is located on another element via another layer or still another element. The same drawing reference numerals are used for the same elements across various figures throughout.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

Hereinafter, embodiments will be described with reference to the drawings.

Figure 2:
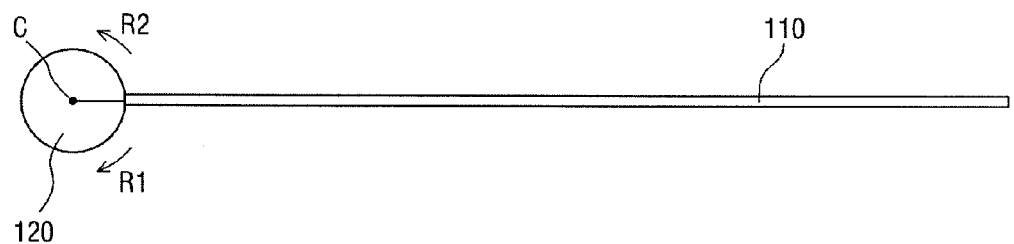
FIG. 2 illustrates a cross-sectional view of a display device according to an embodiment.
Figure 3:
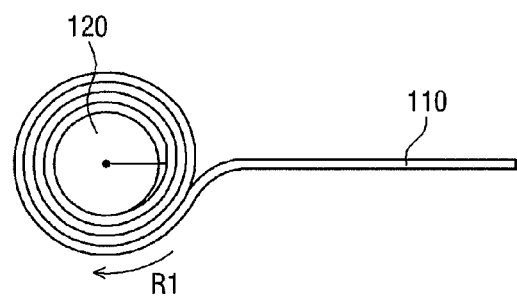
FIG. 3 illustrates a cross-sectional view of the display device of FIG. 2 that is wound in a first rotating direction.
Figure 4:
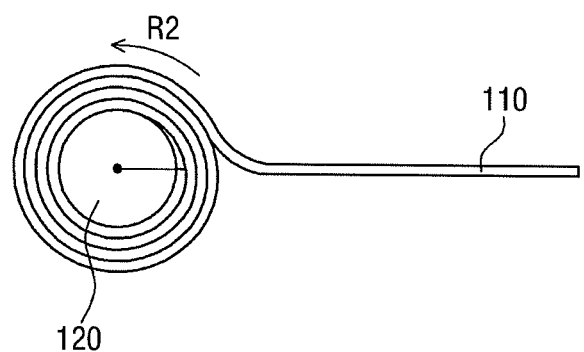
FIG. 4 illustrates a cross-sectional view of the display device of FIG. 2 that is wound in a second rotating direction.

FIG. 1 illustrates a perspective view of a display device according to an embodiment, and FIG. 2 illustrates a cross-sectional view of a display device according to an embodiment. FIG. 3 illustrates a cross-sectional view of the display device of FIG. 2 that is wound in a first rotating direction, and FIG. 4 illustrates a cross-sectional view of the display device of FIG. 2 that is wound in a second rotating direction.

Referring to FIGS. 1 to 4, a display device 10 includes a display panel 110, a first roller 120, and a driving motor 130.

The display panel 110 may display an image. The display panel 110 may be any one of a LCD (Liquid Crystal Display) panel, an electrophoretic display panel, an OLED (Organic Light Emitting Diode) panel, an LED (Light Emitting Diode) panel, an inorganic EL (Electroluminescent display) panel, a FED (Field Emission Display) panel, a SED (Surface-conduction Electron-emitter Display) panel, a PDP (Plasma Display Panel), and a CRT (Cathode Ray Tube). The display panel 110 may be a flexible display panel, and may be formed of a plastic material having predetermined flexibility. Further, the display panel 110 may be rollable.

The display panel 110 may include a display portion 112 and a bonding portion 111. The display portion 112 may display an image. Although not illustrated, the display portion 112 may display a plurality of pixels including thin film transistors, and may include various kinds of devices and wirings that are required to drive the display portion 112. The display portion 112 may display an image through, for example, one surface thereof. In an embodiment, the display portion 112 may display an image through both surfaces thereof.

The bonding portion 111 may be formed at an edge of one side of the display portion 112. The bonding portion 111 may be combined with one region of the first roller 120, and the display panel 110 may be connected to the first roller 120 through the bonding portion 111. Further, a driving integrated circuit chip 121 may be mounted on the bonding portion 111. The driving integrated circuit chip 121 may generate a driving signal for driving the display portion 112, and may provide the driving signal to the respective pixels.

The first roller 120 may be connected to the display panel 110. The first roller 120 may be rotated on the basis of a center axis C. The first roller 120 may be in, for example, a cylindrical shape. In some embodiments, the first roller 120 may be in the form of a rectangular prism, a triangular prism, or a hexagonal prism. The first roller 120 may include a roller pad 122 on which the bonding portion 112 is seated. The roller pad 122 may have a structure that is evenly recessed and on which the bonding portion 112 may be seated. FIG. 1 illustrates an exemplary shape and an exemplary structure of the roller pad 122. The roller pad 122 may be connected to an external power supply circuit (not illustrated) to transfer an external signal and electric power to the mounted driving integrated circuit chip 121.

The display panel 110 may be wound on an outer surface of the first roller 120. As the first roller 120 is rotated, the display panel 110 may be wound on the outer surface of the first roller 120. When not in use, the display panel 110 may be wound on the outer surface of the first roller 120. The display panel 110 that has been wound on the first roller 120 may be unwound to be used. In some embodiments, the display device may further include a housing, and the first roller 120 and the display panel 110 that is wound on the first roller 120 may be accommodated in the housing.

The driving motor 130 may be formed at one end of the first roller 120. The display device 10 may include at least one driving motor 130, and the driving motor 130 may rotate the first roller 120. FIG. 1 illustrates an exemplary position and an exemplary number of driving motors 130. The driving motor 130 may rotate the first roller 120 in a first rotating direction R1 or in a second rotating direction R2. The first rotating direction R1 and the second rotating direction R2 may be opposite to each other. Exemplarily, the first rotating direction R1 may be the clockwise direction, and the second rotating direction R2 may be the counterclockwise direction.

The display panel 110 may be wound on the first roller 120 according to the rotating direction of the first roller 120, and the display panel 110 may be wound on an outer surface of the first roller 120 in the first rotating direction R1 or in the second rotating direction R2. For example, as illustrated in FIG. 3, the display panel 110 may be wound on the first roller 120 in the first rotating direction R1. Further, as illustrated in FIG. 4, the display panel 110 may be wound on the first roller 120 in the second rotating direction R2. The display panel 110 may be wound not only in one rotating direction but also in the opposite rotating direction.

The rotating direction of the display panel 110 may be alternately changed. For example, the display panel 110 may be wound on the outer surface of the first roller 110 alternately in the first and second rotating directions R1 and R2 in a periodic manner. For example, the display panel 110, which has been once wound in the first rotating direction R1, may be wound in the second rotating direction R2 next time after being unwound to be used, and the stress of the display panel 110, which may occur due to winding in one direction, may be offset. A user of the display device 10 may set the rotating direction of the first roller 120 by controlling the driving motor 130, and the display panel 110 may be wound on the first roller 120 according to the set rotating direction. Further, the driving motor 130 may be controlled to adjust the winding in the first and second rotating directions R1 and R2 in a specific period. For example, the driving motor 130 may be controlled to perform the winding once in the first rotating direction R1, and then to perform the winding in the second rotating direction R2 next time.

An image may be displayed on one surface of the display panel 110, and the upper and lower portions of the display panel 110 may have different configurations. The upper and lower portions of the display panel 110 may have different configurations, stresses that occur during the winding may also differ, and the winding speed in the first rotating direction R1 may be set to be different from the winding speed in the second rotating direction R2. The winding speed means substantially the rotating speed of the first roller 110. For example, in the rotating direction in which relatively higher stress occurs, the winding may be performed at relatively lower speed than the winding speed in the rotating direction in which relatively lower stress occurs, and stress occurrence may be reduced.

Further, the wound diameter of the display panel that is wound in the first rotating direction R1 may be set to be different from the wound diameter of the display panel that is wound in the second rotating direction R2. The wound diameter may be a linear distance between the center axis C of the first roller 120 and the outer surface of the wound display panel. For example, the wound diameter in the rotating direction in which relatively higher stress occurs may be set to be larger than the wound diameter in the rotating direction in which relatively lower stress occurs, and stress occurrence may be reduced.

An image may be displayed on one surface and the other surface of the display panel 110, and the upper and lower portions of the display panel 110 may have substantially the same configuration. For example, the stresses that occur during the winding may be substantially equal to each other, and the winding speed in the first rotating direction R1 may be substantially equal to the winding speed in the second rotating direction R2. Further, the wound diameter of the display panel that is wound in the first rotating direction R1 may be substantially equal to the wound diameter of the display panel that is wound in the second rotating direction R2.

Hereinafter, a display device according to another embodiment will be described.

Figure 5:
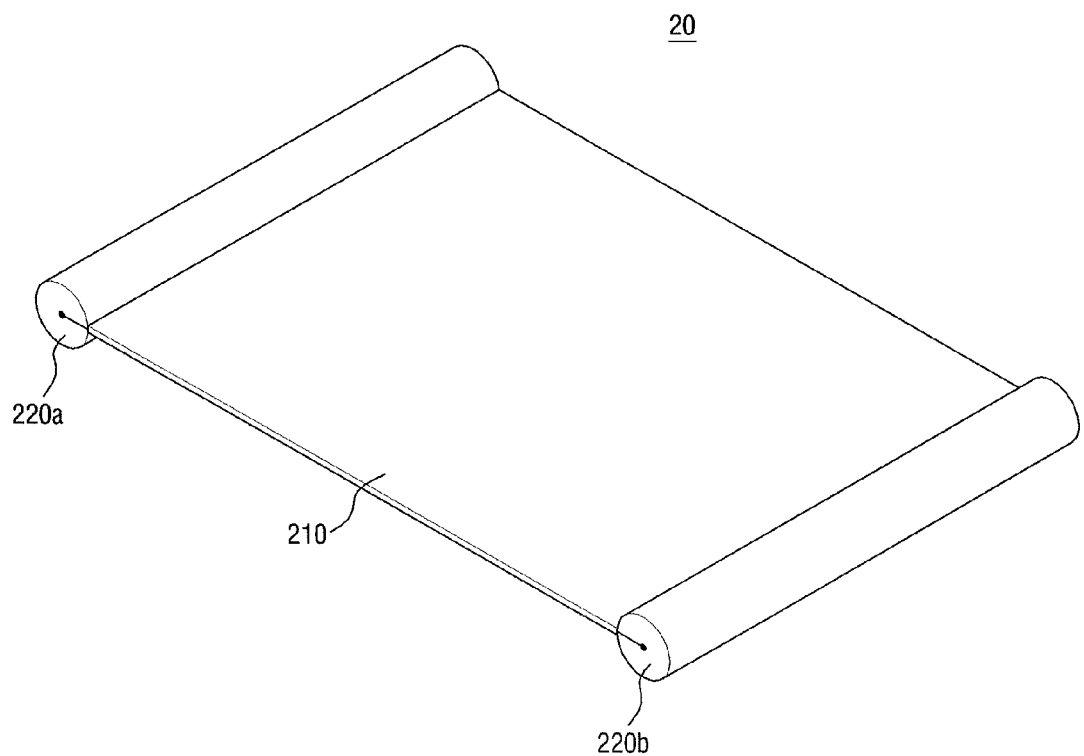
FIG. 5 illustrates a perspective view of a display device according to another embodiment.
Figure 6:
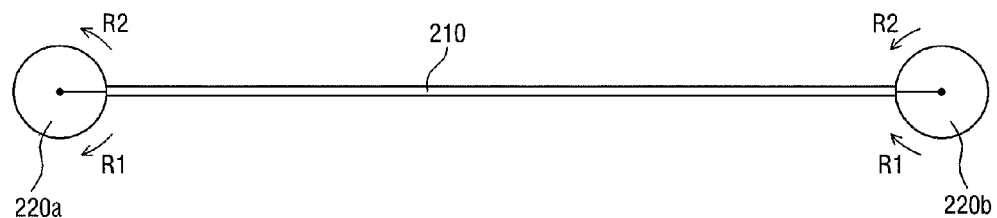
FIG. 6 illustrates a cross-sectional view of a display device according to another embodiment.

FIG. 5 illustrates a perspective view of a display device according to another embodiment, and FIG. 6 illustrates a cross-sectional view of a display device according to another embodiment. FIGS. 7 to 10 illustrate cross-sectional views explaining winding direction of the display device of FIG. 6.

Referring to FIGS. 5 to 10, a display device 20 according to another embodiment includes a display panel 210, a first roller 220a, and a second roller 220b.

Explanation of the display panel 210 and the first roller 220a is substantially the same as the explanation of the configuration of the display device 10 according to an embodiment, and the duplicate explanation thereof will be omitted.

The second roller 220b may be formed on the display panel 210 to face the first roller 220a. The first roller 220a may be formed at one end of the display panel 210, and the second roller 220b may be formed at the other end of the display panel 210. The display panel 210 may be wound on an outer surface of the first roller 220a and on an outer surface of the second roller 220b. For example, the display panel 210 may be bidirectionally wound. The first roller 220a and the second roller 220b may be wound in the first rotating direction R1 or in the second rotating direction R2.

Figure 7:
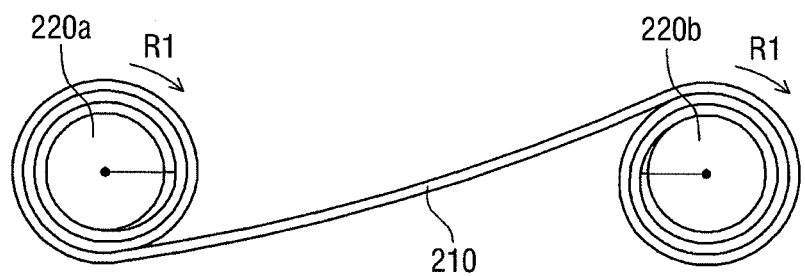
FIGS. 7 to 10 illustrate cross-sectional views explaining winding direction of the display device of FIG. 6.
Figure 8:
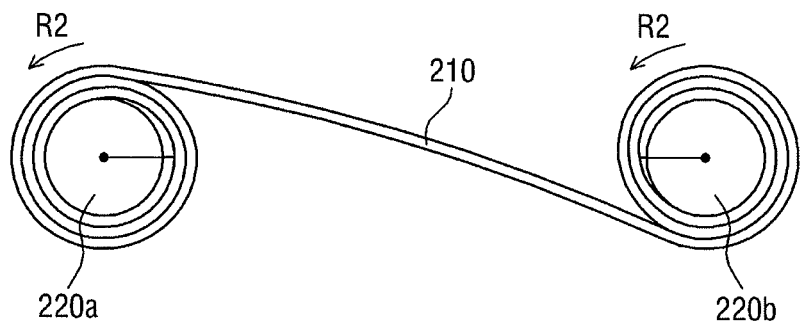
Figure 9:
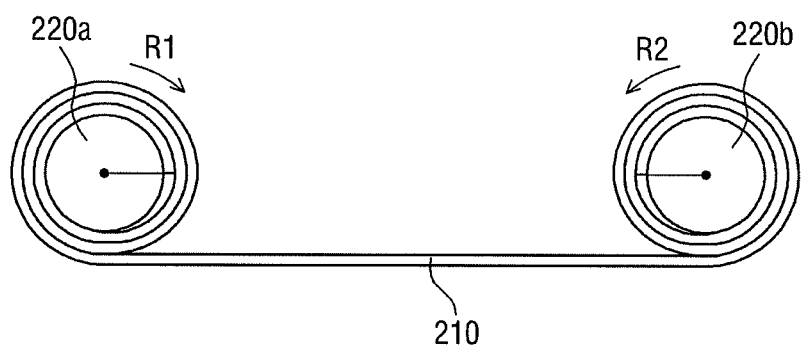
Figure 10:
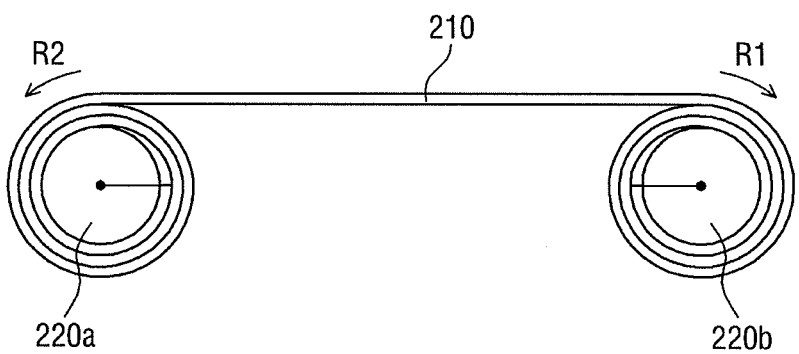

The display panel 210 may be wound on the first roller 220a and the second roller 220b in the same rotating direction. For example, the display panel 210 may be wound in the first rotating direction R1 as illustrated in FIG. 7, or may be wound in the second rotating direction R2 as illustrated in FIG. 8. Further, the display panel 210 may be wound on the first roller 220a and the second roller 220b in different rotating directions as illustrated in FIGS. 9 and 10.

As described above, the display panel 210 may be be wound on the first roller 220a and the second roller 220b in different rotating directions, the stress that may occur due to the winding of the display panel 210 in one direction may be dispersed, and the static characteristics of the display panel 210 may be prevented from being changed.

Hereinafter a display device according to still another embodiment will be described.

Figure 11:
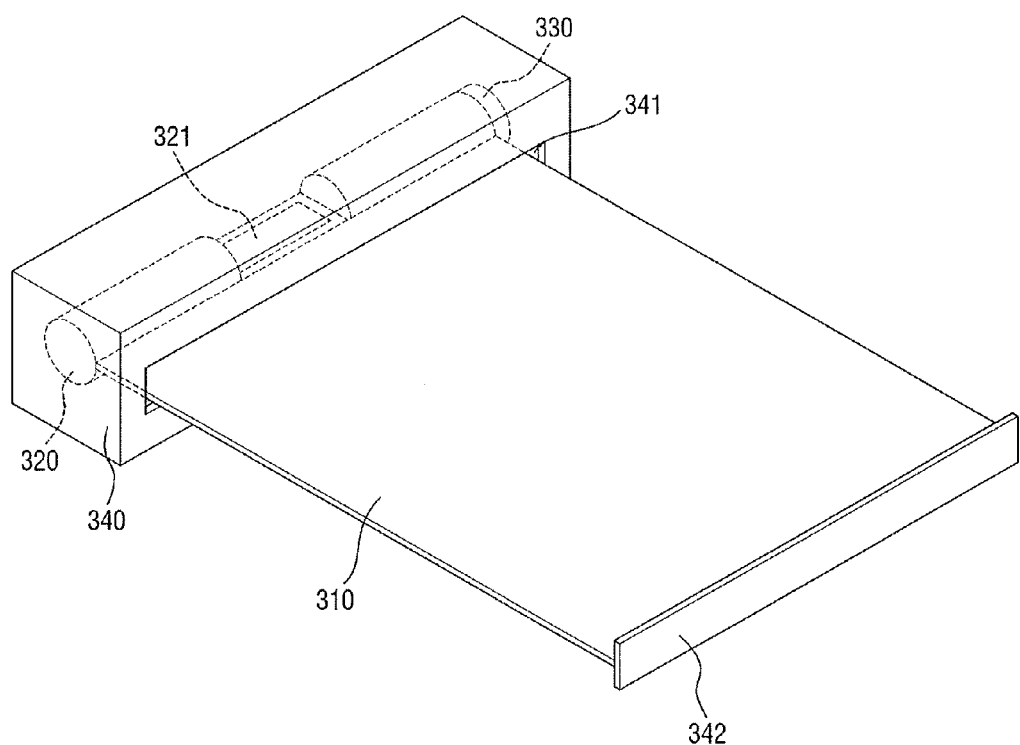
FIG. 11 illustrates a perspective view of a display device according to still another embodiment.
Figure 12:
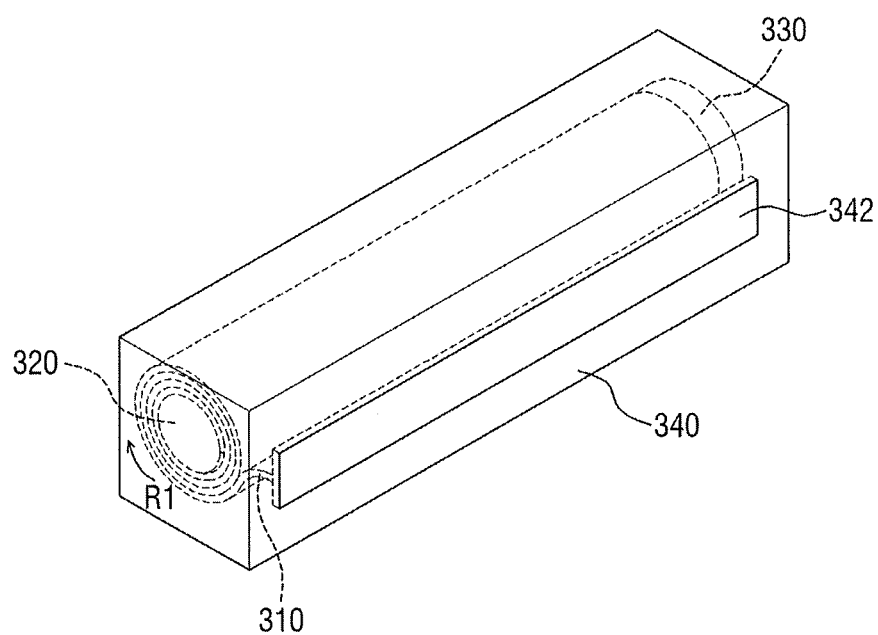
FIG. 12 illustrates a perspective view of the display device of FIG. 11 that is wound in a first rotating direction.
Figure 13:
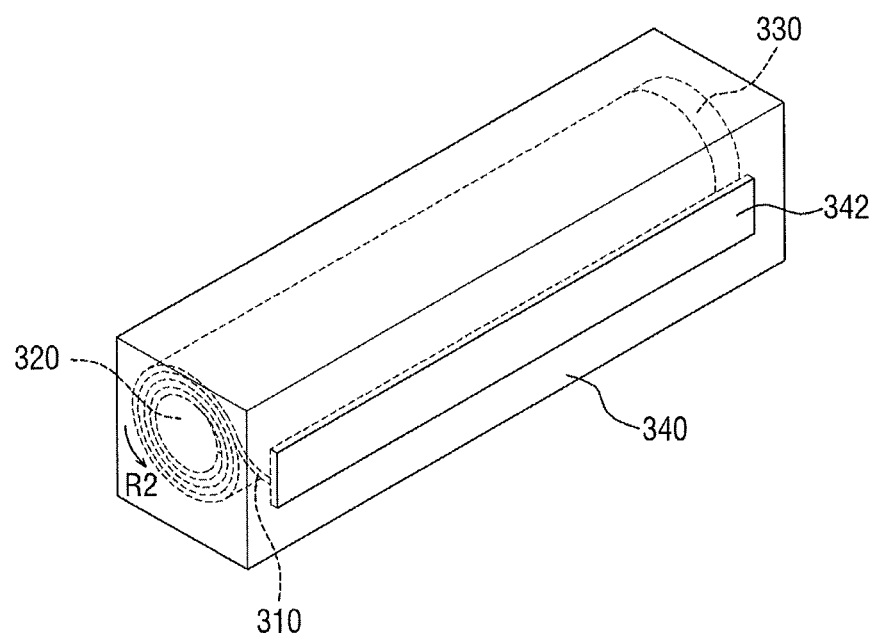
FIG. 13 illustrates a perspective view of the display device of FIG. 11 that is wound in a second rotating direction.
Figure 14:
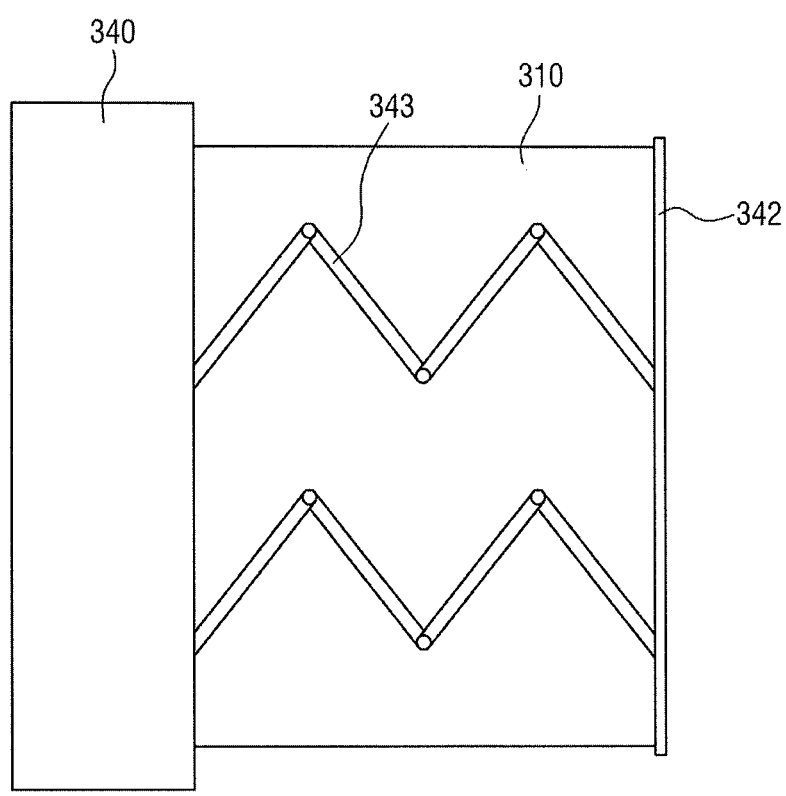
FIG. 14 illustrates a rear view of the display device of FIG. 11.

FIG. 11 illustrates a perspective view of a display device according to still another embodiment. FIG. 12 illustrates a perspective view of the display device of FIG. 11 that is wound in a first rotating direction, and FIG. 13 illustrates a perspective view of the display device of FIG. 11 that is wound in a second rotating direction. FIG. 14 illustrates a rear view of the display device of FIG. 11.

Referring to FIGS. 11 to 14, a display device 30 according to still another embodiment may include a display panel 310, a first roller 320, a driving motor 330, and a housing 340.

The housing 340 may be a space in which the display panel 310 is accommodated. The display panel 310 may be accommodated in the housing 340 in a wound state. For example, when the display device 30 is not in use, a user of the display device 30 may wind the display panel 310 to accommodate the display panel 310 in the housing 340, while when the display device 30 is in use, the user may draw the display panel 310 out of the housing 340.

The housing 340 may protect the display panel 310 in a wound state from external impacts and foreign substances. As illustrated in FIG. 11, the housing may be in, for example, a rectangular prism shape.

An opening 341 may be formed on one surface of the housing 340. The opening 341 may be a path through which the display panel 310 is wound or unwound. For example, the display panel 310 may be accommodated in the housing through the opening 341 as being wound. The display panel 310 may be wound in a first rotating direction R1 or in a second rotating direction R2 that is opposite to the first rotating direction R1. As illustrated in FIG. 12, the display panel 310 may be wound in the first rotating direction R1 to be accommodated in the housing 340. Further, as illustrated in FIG. 13, the display panel 310 may be wound in the second rotating direction R2 to be accommodated in the housing 340. The display panel 310 may be wound in opposite directions, and stress of the display panel 110, which may occur due to winding of the display panel 310 in one direction, may be offset.

The first roller 320, on which the display panel 310 is wound, may be formed in the housing 340. The driving motor 330 that rotates the first roller 320 may be arranged at one end of the first roller 320. The driving motor 330 may rotate the first roller 320 in the first rotating direction R1 or in the second rotating direction R2 based on the center axis of the first roller 320. The display panel 310 may include a bonding portion 311 that is formed at an edge of one side and is connected to a roller pad of the first roller 320. For example, the display panel 310 may be combined with the first roller 320 through the bonding portion, and may be wound on the outer surface of the first roller 320 in the rotating direction of the first roller 320.

The display panel 310 may be wound on the outer surface of the first roller 320 alternately in the first and second rotating directions R1 and R2 in a periodic manner. For example, the rotating direction of the driving motor 330 may be periodically changed. The rotating direction of the driving motor 330 may differ according to a user's setting.

Further, an image may be displayed on one surface of the display panel 310, the upper and lower portions of the display panel 310 may have different configurations, and stresses that occur during the winding of the display panel 310 may also differ from each other. In consideration of a difference in stress, the winding speed in the first rotating direction R1 may be set to be different from the winding speed in the second rotating direction R2. Further, the wound diameter of the display panel 310 that is wound in the first rotating direction R1 may be set to be different from the wound diameter of the display panel 310 that is wound in the second rotating direction R2.

The housing 340 may further include a fixing member 342 and a support member 343. The fixing member 342 may prevent the display panel 310 from being overwound. The fixing member 342 may be connected to one side of the display panel 310 that is not connected to the first roller 320. The fixing member 342 may be formed to be larger than the opening 341 to prevent the display panel 310 from being overwound on the outer surface of the first roller 320. FIG. 11 illustrates an exemplary shape and an exemplary structure of the fixing member 342.

When the display panel 310 is unwound, the support member 343 may support the display panel 310. For example, the support member 343 may support the display panel 310 so that the display panel 310 may be horizontally spread. When the display panel 310 is wound, the support member 343 may contract to be accommodated in the housing 340, while when the display panel 310 is unwound, the support member 343 may extend to support the display panel. FIG. 14 illustrates an exemplary shape and an exemplary structure of the support member 343 that may support the display panel 310. In some embodiments, the support member 343 may be formed on both side portions of the display panel 310 to support the unwound display panel 310.

Other constituent elements of the display device 30 are substantially the same as those of the display device 10 according to one embodiment and the display device 20 according to another embodiment, and the detailed description thereof will be omitted.

By way of summation and review, by using substrates made of flexible materials, such as plastic and foil, instead of glass substrates, flexible display devices, which may be bent, may be manufactured. Further, rollable display devices may be in a rolled state when not in use and may be spread out or open when in use.

A rollable display device that can be rolled up only in one direction is always in a rolled state in the same direction when not in use, and stress may be continuously applied to a display panel. Rolling only in one direction may exert an influence on the static characteristics of the display device and may cause a problem that the display panel may be unable to be completely spread in a horizontal direction when in use.

Embodiments provide a rollable display device that may disperse stress that may be caused by rolling.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
a flexible display panel; and
a first roller connected to the flexible display panel and having an outer surface, the first roller to wind the flexible display panel on the outer surface, wherein:
in a first mode, the first roller winds in a first rotating direction and unwinds in a second rotating direction opposite to the first rotating direction, and
in a second mode, the first roller winds in the second rotating direction and unwinds in the first rotating direction, wherein
a winding speed of the flexible display panel in the first rotating direction is different from a winding speed of the flexible display panel in the second rotating direction.

2. The display device as claimed in claim 1, wherein a wound diameter of the flexible display panel in the first rotating direction is different from a wound diameter of the flexible display panel in the second rotating direction.

3. The display device as claimed in claim 1, further comprising a second roller connected to the flexible display panel, facing the first roller, and having an outer surface, the second roller to wind the flexible display panel on the outer surface of the second roller, the second roller to wind in the first rotating direction or in the second rotating direction.

4. The display device as claimed in claim 3, wherein the flexible display panel is wound on the first roller and the second roller in a same rotating direction.

5. The display device as claimed in claim 3, wherein the flexible display panel is wound on the first roller and the second roller in different rotating directions.

6. The display device as claimed in claim 1, further comprising a driving motor that rotates the first roller.

7. The display device as claimed in claim 1, wherein the flexible display panel includes a display portion to display an image, a bonding portion at an edge of one side of the display portion connected to the first roller, and a driving integrated circuit chip on the bonding portion.

8. The display device as claimed in claim 7, wherein the first roller includes a recessed roller pad, the bonding portion being on the recessed roller pad.

9. The display device as claimed in claim 1, wherein the first roller winds the flexible display panel on the outer surface of the first roller alternately in the first and second rotating directions in a periodic manner.

10. The display device as claimed in claim 9, wherein winding the flexible display panel on the outer surface of the first roller alternately in the first and second rotating directions in a periodic manner disperses stress being caused due to winding of the flexible display panel in only one rotating direction and prevents changing of static characteristics of the flexible display panel.

11. The display device as claimed in claim 1, further comprising a housing accommodating the display panel and the first roller.

12. A display device, comprising:
a housing having an opening at one surface thereof; and a flexible display panel accommodated in the housing, the flexible display panel to wind in and to unwind out of the housing through the opening, wherein in a first mode, the flexible display panel winds in the housing in a first rotating direction and unwinds out of the housing in a second rotating direction opposite to the first rotating direction, and in a second mode, the flexible display panel winds in the housing in the second rotating direction and unwinds out of the housing in the first rotating direction, wherein a winding speed of the flexible display panel in the first rotating direction is different from a winding speed of the flexible display panel in the second rotating direction.

13. The display device as claimed in claim 12, further comprising a first roller in the housing, the first roller having an outer surface, the first roller to wind the flexible display panel on the outer surface, the first roller to wind in the first rotating direction or in the second rotating direction.

14. The display device as claimed in claim 13, wherein the first roller winds the flexible display panel on the outer surface of the first roller alternately in the first and second rotating directions in a periodic manner.

15. The display device as claimed in claim 14, wherein winding the flexible display panel on the outer surface of the first roller alternately in the first and second rotating directions in a periodic manner disperses stress being caused due to winding of the flexible display panel in only one rotating direction and prevents changing of static characteristics of the flexible display panel.

16. The display device as claimed in claim 13, further comprising a second roller connected to the flexible display panel, facing the first roller, and having an outer surface, the second roller winding the flexible display panel on the outer surface of the second roller, the second roller winding in a same rotating direction as a rotating direction of the first roller or in a different rotating direction from the rotating direction of the first roller.

17. The display device as claimed in claim 13, further comprising a driving motor that rotates the first roller.

18. The display device as claimed in claim 13, wherein a wound diameter of the flexible display panel in the first rotating direction is different from a wound diameter of the flexible display panel in the second rotating direction.

19. The display device as claimed in claim 12, further comprising at least one of a fixing member that prevents the flexible display panel from being overwound or a support member configured to support the flexible display panel when the flexible display panel is unwound.

* * * * *